INVENTORS:
JOHN H. RALEY
RICHARD D. MULLINEAUX
BY: James Podoree
THEIR ATTORNEY

INVENTORS
JOHN H. RALEY
RICHARD D. MULLINEAUX
BY
THEIR ATTORNEY

United States Patent Office 2,901,520
Patented Aug. 25, 1959

2,901,520

PURIFICATION OF DIOLEFIN PRODUCT FROM HYDROCARBON-IODINE DEHYDROGENATION REACTION BY PROMPT SOLVENT CONTACT TO REMOVE IODINE SPECIES FROM HYDROCARBON PHASE

John H. Raley, Walnut Creek, and Richard D. Mullineaux, Oakland, Calif., assignors to Shell Development Company, New York, N.Y., a corporation of Delaware Application February 6, 1956, Serial No. 563,658

14 Claims. (Cl. 260—680)

This invention relates to an improved process for producing diolefins. It relates more particularly to a process for the production and recovery of diolefins containing a chain, open or closed, of 4 to 5 carbon atoms, by dehydrogenation of corresponding more saturated compounds in the presence of reactive proportions of iodine.

It is an object of the invention to provide a process for producing diolefins from corresponding more saturated compounds. It is a further object to provide a process for recovering diolefins from a reaction mixture in which they occur at a temperature in excess of about 300° C. in the presence of active iodine species including hydrogen iodide.

It is among the specific objects of the invention:

To provide a process for producing butadiene in high yield from n-butane or butenes;

To provide a process for producing pentadiene in high yield from n-pentane or pentenes;

To provide a process for producing isoprene in high yield from isopentane or isopentenes;

To provide a process for producing cyclopentadienes in high yield from the corresponding cyclopentanes or cyclopentenes.

Other objects will appear from the description of the invention which will be made with reference to the accompanying drawing wherein.

Diolefins, and particularly butadiene and isoprene, are in great commercial demand because of their suitability for conversion into synthetic rubbers and other useful polymeric materials. Processes are known for producing butadiene by conversions starting with ethanol and by dehydrogenation of butylenes; these processes are limited by availability and cost of the starting materials. Processes are known for producing butadiene and isoprene by steam cracking of hydrocarbons; these processes are characterized by poor selectivity of conversion to desired diolefins. Only one commercial process is in use for producing butadiene or isoprene by direct dehydrogenation of the corresponding paraffin. The commercial butane dehydrogenation process employs a heterogeneous catalyst (chromia, supported on alumina) and requires substantially subatmospheric pressure, e.g. 2.5 p.s.i.a., and even then does not permit the production of more than about 50 lb. of butadiene from 100 lb. of n-butane, the remainder being lost by side reactions, mainly cracking and coking. That process is limited to a relatively low maximum allowable butane conversion per pass in order to reduce losses due to the cracking and coking reactions. The conditions for dehydrogenation of isopentane to isoprene are similar.

The present invention provides a process suitable for commercial production of diolefins from corresponding paraffins, e.g. butadiene from n-butane, in ultimate yields in excess of 90% of the paraffin charged to the process.

It has been shown by one of the present inventors, John H. Raley, in copending U.S. patent application, Serial No. 489,301, filed February 18, 1955, that conjugated diolefins can be produced from more saturated hydrocarbons by reaction at an elevated temperature with a reactive proportion of iodine with the resulting formation of hydrogen iodide. However, the recovery of diolefins from the reaction mixture is made difficult by their tendency to react at temperatures below reaction temperature with hydrogen iodide to form monoolefins, and to react with active iodine species, including hydrogen iodide and elemental iodine, to form stable iodides at the lower temperatures of separation.

The present invention is an improved process for the production and recovery of olefinic compounds in high yield and high purity to the substantial exclusion of iodine derivatives thereof.

According to the process of the present invention certain aliphatic and naphthenic hydrocarbons are converted to the corresponding diolefins by admixing the feed hydrocarbon with a substantial proportion of iodine, contacting the mixture in a reaction zone at an elevated reaction temperature between 300° and 750° C. to produce a product mixture comprising diolefin and HI, removing the product mixture from the reaction zone at a reaction temperature no lower than 300° C., promptly substantially reducing the rate of reaction of the active iodine species, especially HI, with the diolefin, promptly separating the active iodine species from the hydrocarbon content of the product mixture and recovering the diolefin. In a single pass operation substantially all possible stable olefinic and diolefinic products of the same carbon skeleton as the feed are formed from the saturated or monoolefinic feed hydrocarbon. In the preferred practice for the production of diolefins, the unconverted feed and the monoolefinic products are recycled to the reaction zone. This operation permits an ultimate diolefin yield exceeding 90% of the charge hydrocarbon in many cases. If iodides of the same carbon skeleton structure as the feed are recovered from the reactor effluent, they are also preferably recycled to the reaction zone for further conversion to the diolefin.

The feed hydrocarbons which can be converted to diolefins in accordance with the present invention are hydrocarbons having no more than one double bond per molecule and having at least four and no more than five carbon atoms in a chain, the chain being open or closed and none of the aliphatic carbon atoms and no more than one of the five naphthenic ring carbon atoms being quaternary. In other words, suitable feed hydrocarbons are, among aliphatic hydrocarbons paraffins and monoolefins having only 4 to 5 carbon atoms in a chain, none of them being quaternary, and among alicyclic hydrocarbons cycloparaffins and cyclomonoolefins having 4 or 5 carbon atoms in the ring with no more than one gem-dialkyl-substitution in the 5 carbon ring alicyclics. Substituents in the suitable feed hydrocarbons are preferably limited to methyl groups or groups connected to the chain by a quaternary carbon atom. When ethyl or longer chain type substituent groups are present, particularly in the alicyclic compounds, the possibility of forming triolefins arises.

Suitable and preferred feed hydrocarbons are, for example, n-butane, n-pentane, isopentane, 2,3-dimethylbutane, 2-methylpentane, 3-methylpentane, 2,4-dimethylpentane, 2,3-dimethylpentane, 2,3,4-trimethylpentane, 2,2-dimethyl-3-ethylpentane (same as 3-tert-butylpentane) and the monoolefins having the same carbon skeleton as the named paraffins, i.e. butene-1, butene-2, pentene-1, pentene-2, 2-methylbutene-1, 2-methylbutene-2, 3-methylbutene-1, and so forth. A less preferred paraffinic feed is 3-ethylpentane, which may lead to the formation of triolefins.

Suitable and preferred alicyclic feed hydrocarbons are the five-carbon ring compounds having no more than one quaternary ring carbon and no substituents other than methyl groups or groups connected to the ring by a quaternary carbon atom. Such compounds are, for example, cyclopentane, methylcyclopentane, 1,2-dimethylcyclopentane, 1,3-dimethylcyclopentane, 1,1-dimethylcyclopentane, the trimethylcyclopentanes (1,2,3-; 1,2,4-; 1,1,2-; 1,1,3-), tetramethylcyclopentanes, pentamethylcyclopentanes and 1,1,2,3,4,5-hexamethylcyclopentane, tert-butylcyclopentane, methyl-t.-butylcyclopentanes, and so forth, as well as the monoolefins having the same carbon skeleton as the named and similar compounds.

Less preferred feeds are the alicyclics having substituents including a chain of 2 or more non-quaternary carbon atoms, e.g. ethyl cyclopentane, n-propylcyclopentane, isopropylcyclopentane, sec. butylcyclopentane, similar compounds having additional ring substituents, and so forth, including monoolefins of the same skeletal structure.

Although cyclobutane and its similar derivatives are possible feed stocks, they have no present commercial significance. The four-carbon-ring naphthenes may be converted to linear rather than cyclic diolefins.

Entirely unsuitable as feed hydrocarbons in the present invention are compounds which, in the presence of iodine at the reaction conditions, are converted to aromatic hydrocarbons. This group of iodine-aromatizable hydrocarbons consists essentially of compounds having at least six non-quaternary non-aromatic carbon atoms contiguous in a chain and of ring compounds having a substituent chain or chains capable of closing a six carbon ring, e.g. n-butyl cyclopentane, n-butyl benzene, ortho-n-propylmethylbenzene, and so forth. The reactions of such compounds with iodine are described in copending U.S. application Serial No. 489,302 of J. H. Raley, filed February 18, 1955.

The feed hydrocarbons of the present invention may be charged as pure compounds or as concentrates thereof, e.g. in narrow boiling fractions. It is often preferable to charge a mixture of a saturated compound and the corresponding monoolefins of the same carbon skeleton.

It is generally undesirable to employ a feed which contains iodine-aromatizable compounds in substantial amount because the HI resulting from the conversion of these compounds causes the diolefin-forming reaction to be suppressed. The presence of only a few mol percent, e.g. 4 or 5%, of iodine aromatizable compound in a non-aromatizable feed capable of producing diolefin can markedly reduce the conversion to diolefin.

The diolefin product recovered according to the present invention is substantially at thermodynamic equilibrium. The conjugated diolefins, which are more stable thermodynamically, are, therefore, usually recovered in preponderant amount compared to the non-conjugated diolefins. Since the thermodynamic stability of non-conjugated diolefins increases, in general, with increasing temperature and molecular weight, such diolefins may be recovered in greater relative yield by carrying out the reaction at a relatively high temperature, followed by very rapid removal of iodine species without substantial intermediate reduction in temperature.

The reaction in accordance with the present invention takes place at temperatures of at least 300° C. and generally in excess of 400° C. At the reaction conditions the equilibrium between the hydrocarbon charged, the reaction products, iodine and hydrogen iodide is such that stable organic iodides are not formed. This is true regardless of the length of time the reaction mixture is maintained at the reaction temperature. Other considerations, however, require that the reaction time be maintained relatively short, particularly to avoid the production of undesired byproducts, including coke, due to excessive dehydrogenation.

The conditions most important in controlling the reaction are the temperature, the ratio of iodine to hydrocarbon, the contact time and the pressure in the reaction zone. These conditions are interrelated so that similar results may be obtained by varying one of these conditions provided another is varied at the same time.

The temperature in the reaction zone is chosen in the range between 300° and 750° C. For most charge stocks best results are obtained between 425° and 650° C. The highest part of the temperature range, i.e. up to 750° C. is suitable only for the conversion of the thermally most stable substances, e.g. n-butane and n-pentane. The range between 400° and 600° C. is preferred for the production of butadiene or pentadienes.

Pressures suitable for use in the present process range from substantially below atmospheric, e.g., from 0.1 atm. abs. to elevated pressures of 10 atm. abs. or higher. Pressures are preferably maintained in the range between 0.5 and 4 atm. abs. and pressures between 1 and 3 atm. abs. are especially preferred. It may sometimes be desirable to employ an inert diluent gas or vapor in the reaction zone. In that case, the partial pressure of iodine plus hydrocarbon should be maintained in the range between 0.1 and 10 atmospheres, preferably between 0.1 and 2 atmospheres and most desirably between 0.2 and 1 atmosphere.

The residence time of the reactants at the selected reaction conditions depends in part on the particular hydrocarbon reactants present as well as on the proportion of iodine to hydrocarbon, and the temperature and pressure. Residence times at reaction conditions are generally in the range between 0.01 and 10 seconds, although in some cases times up to 15 or 20 seconds may be used. The residence time should be long enough to permit equilibrium to be approached, but not so long that undesirable side reactions take place to an appreciable extent. At a given set of reaction conditions, the order of reactivity, i.e. the rate at which equilibrium is approached, is such that, among the aliphatic hydrocarbons, paraffins are less reactive than olefins of the same carbon skeleton, and normal aliphatics are less reactive than branched aliphatics. The reactivity of branched aliphatics increases with increasing branching. Among alicyclics, the saturated ones are less reactive than the olefins of the same carbon skeleton and the reactivity also increases with increasing branching. Aliphatics are less reactive than alicyclics of the same number of carbon atoms and the same degree of unsaturation and branching. In general, the more reactive compounds tend to undergo undesirable side reactions, particularly those that ultimately lead to coke formation, at a more rapid rate.

When converting a feed consisting of paraffins, the residence time is preferably in the range between 0.3 and 8 seconds and for normal paraffins it is preferably at least 1 to 2 seconds. The more reactive compounds are readily converted at shorter residence times, e.g. in the range between 0.1 and 5 seconds. With any given feed the required time decreases as the reaction temperature is increased.

When the mixture charged to the reaction zone consists only of hydrocarbons of the type described and of elemental iodine and, if desired, of inert gas or vapor, then the dehydrogenation is an equilibrium limited reaction. Equilibrium is ordinarily approached very quickly, i.e. within the times set out above, and no advantage is obtained by permitting the reaction mixture to reside in the reaction zone at reaction conditions once equilibrium has been obtained.

An important factor in the practice of the invention is the carrying out of the reaction in the presence of a substantial proportion of free iodine. For each double bond formed in the reaction zone, two atoms of iodine are converted from elemental iodine to HI.

The mole ratio of iodine to hydrocarbon in the charge to the reaction zone should be at least about 0.1. This represents the minimum relative amount of iodine which is required to direct the desired dehydrogenation reaction while substantially suppressing undesired side reactions, particularly thermal reactions, such as cracking. At higher temperatures and with the less thermally stable hydrocarbons at least 0.2 to 0.3 mole iodine per mole hydrocarbon is preferred in the charge mixture. The upper limit of the mole ratio of iodine to hydrocarbon used is generally set by practical considerations connected with sizing of processing equipment and the like. An actual ratio of 10 to 1 is, therefore, not generally exceeded. Preferred mole ratios are in the range between 0.2 and 5 and particularly suitable ratios are between 0.2 and 2 moles iodine per mole hydrocarbon feed. In general, the reaction temperature and other conditions will be chosen to obtain the desired result with the lowest practical iodine to hydrocarbon ratio.

It has been found possible, in some cases, to improve iodine utilization by reconverting HI to $I_2$ while the reaction mixture is at reaction conditions. Such improved efficiency of iodine utilization may be obtained, for example, by placing into the reaction zone or between reaction zones a catalyst capable of converting HI to $I_2+H_2$, e.g. platinum metal or activated carbon, or by oxidizing HI to $I_2+H_2O$ in the reaction zone. When employing such a method of improving iodine utilization the iodine to hydrocarbon ratios are lower, within the above stated ranges, than would otherwise be the case for the same amount of hydrocarbon conversion.

The minimum required amount of iodine is preferably added to the reaction zone as elemental iodine, e.g. admixed with the feed hydrocarbon as a vapor mixture. The total effective amount of iodine must be present in the reaction zone as free iodine and it is preferred to add it as such with the feed or, if desired, by injecting part into the reacting mixture. Compounds which liberate free iodine at the reaction conditions may also be employed. The amount of iodine which must be added may be reduced, as stated, by reconverting HI to $I_2$ in the reaction zone, but this cannot reduce the iodine requirement below the minimum of 0.1 mole per mole of hydrocarbon.

In order to produce diolefin in substantial yield it is desirable to have a diolefin concentration of at least 10 mole percent (based on original feed hydrocarbon) in the effluent from the reaction zone, and preferably as much as 20% or more. Higher concentrations of diolefin in the effluent are desirable when other considerations permit. To obtain a high ultimate conversion of the charge hydrocarbon to diolefin it is generally necessary to recycle unconverted original feed hydrocarbon and monoolefin intermediates. When producing a hydrocarbon product containing 20% diolefin (based on charge), a yield of over 90% of diolefin, based on charge, is obtainable by recycling unconverted paraffin and monoolefin intermediates in a ratio of about 4 parts recycle to 1 part fresh feed.

Figure 1:
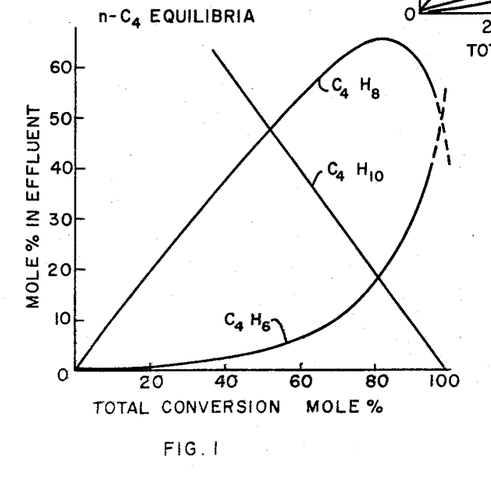
Fig. 1 is an equilibrium diagram for n-butane and the corresponding olefins and conjugated diolefin.
Figure 2:
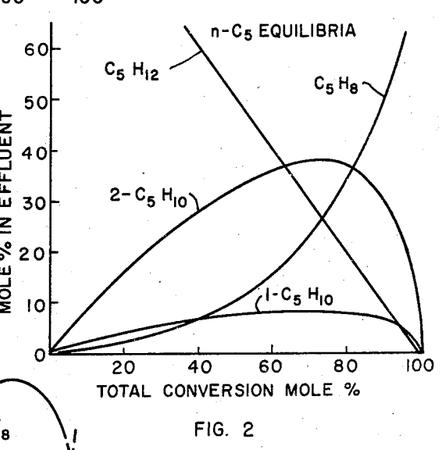
Fig. 2 is an equilibrium diagram for n-pentane and the corresponding olefins and conjugated diolefin.
Figure 3:
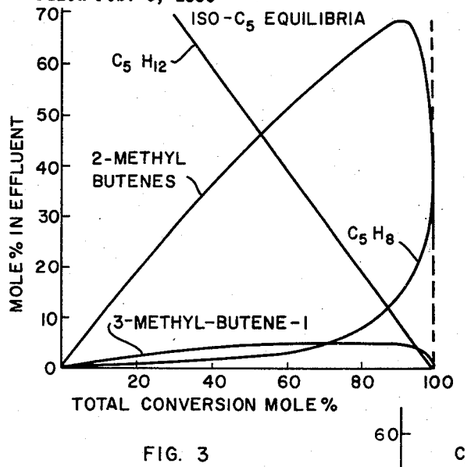
Fig. 3 is an equilibrium diagram for isopentane and the corresponding olefins and conjugated diolefin.

The equilibrium composition of hydrocarbon mixtures in the presence of elemental iodine and, optionally, inert diluent, is shown in Fig. 1 for an n-butane feed at a temperature of 627° C., in Fig. 2 for an n-pentane feed at a temperature of 550° C. and in Fig. 3 for an isopentane feed at a temperature of 550° C. The equilibria in Figs. 1 to 3 are calculated from thermodynamic data. Although at the preferred reaction conditions equilibrium may not be fully attained, conversions of 85% of equilibrium are readily attainable in accordance with the present invention. From Fig. 1 it is seen that the butadiene concentration in the effluent is 10 mole percent, based on $C_4$ hydrocarbons, at a total butane conversion of approximately 73 mole percent, and the butadiene concentration is 20 mole percent, based on $C_4$ hydrocarbons, at a total butane conversion of about 86 mole percent. Similarly, from Fig. 2 it is seen that the pentadiene concentration is 10%, based on total $C_5$ hydrocarbons, at a total conversion of 50% and 20%, based on total $C_5$ hydrocarbons, at a total conversion of 66%. From Fig. 3 the isoprene concentration is 10%, based on total $C_5$ hydrocarbons, at an isopentane conversion of 85% and 20% at an isopentane conversion of 93%.

Figure 4:
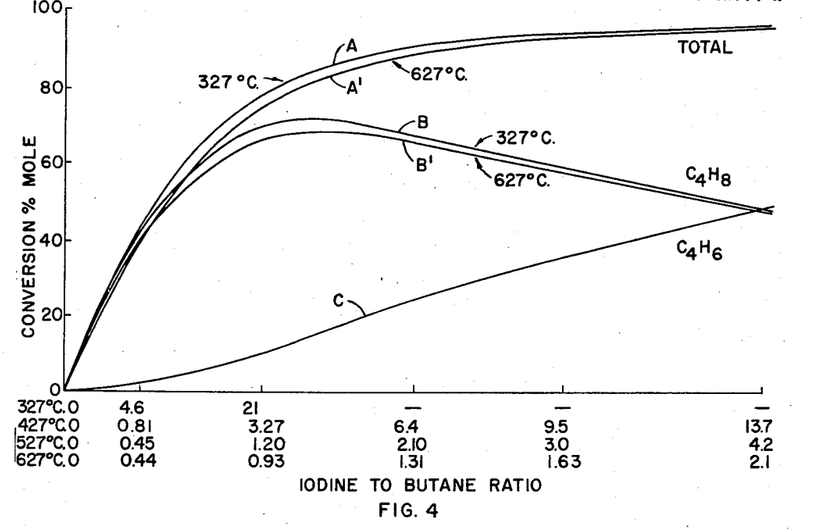
Fig. 4 is a plot of n-butane conversion versus iodine-to-butane ratio at various temperatures.
Figure 5:
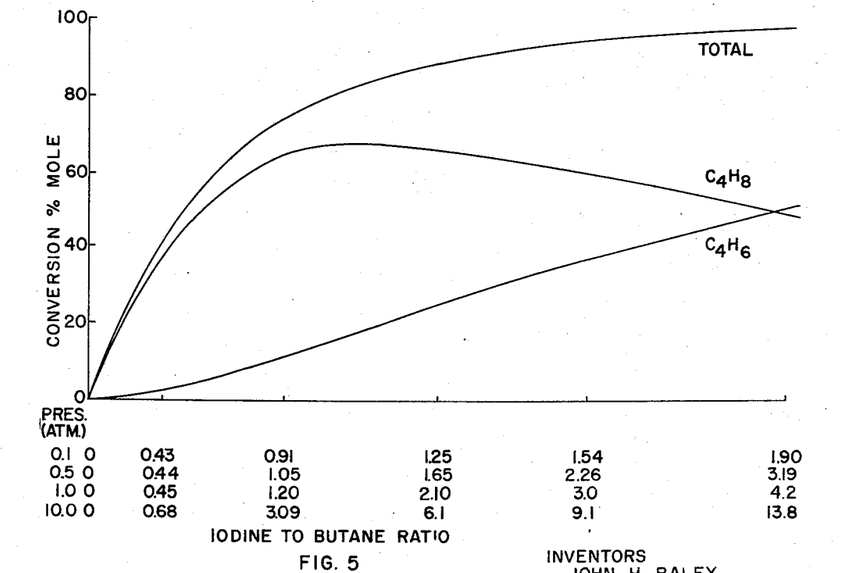
Fig. 5 is a plot of n-butane conversion versus iodine-to-butane ratio at various pressures.

Fig. 4 and Fig. 5 illustrate the interrelation of mole percent conversion and the important reaction conditions of temperature, pressure and iodine-to-hydrocarbon ratio.

In Fig. 4, conversion of n-butane, in mole percent, at 1 atmosphere pressure of reactants, is plotted as the ordinate and iodine-to-butane ratio at temperatures between 327° and 627° C. as abscissas. Curves A and A' represent the total conversion at temperatures of 327° C. and 627° C., respectively, B and B' the conversion to butylenes at 327° and 627° C. and C the conversion to butadiene at either temperature. The displacement between A and A' and B and B', respectively, and the lack of such displacement for C is due to the fact that the ratio of butadiene to butylene, at a fixed total conversion, is higher at the higher of these temperatures. The interchangeability of high temperature for high iodine-to-butane ratio in order to achieve a desired total conversion and a consequent high butadiene yield on a once-through basis is illustrated by comparing the four abscissa scales. For example, it is seen from curve A that a total conversion of 78% at 327° C. requires an iodine-to-butane ratio of 21. From curve A' it is seen that 78% conversion at 627° C. requires an iodine-to-butane ratio of only about 1.0. The conversion to butadiene in the former case is 11% and in the latter case about 13.5%. Consequently, the higher temperature not only permits operating at a very much lower iodine-to-butane ratio but also results in a quite appreciable increase in selectivity to butadiene at a fixed overall conversion.

A similar relationship between total pressure of iodine species $(I_2+HI)$ plus $C_4$ hydrocarbons and the iodine-to-butane charge ratio at a fixed temperature of 527° C. is illustrated in Fig. 5. The pressures represent the sum of the absolute vapor pressures of iodine species and $C_4$ hydrocarbons, regardless of the presence of inert diluent gas or vapor. It will be readily seen that relatively low pressures of reactants permit the use of much lower iodine-to-butane ratios for obtaining a given degree of once-through conversion. Because of practical considerations it is desirable to maintain the system at a total pressure of at least one atmosphere absolute and preferably between one and three atmospheres. Use of an inert diluent gas or vapor permits operating at a pressure of iodine plus hydrocarbon below 1 atmosphere, with the concomitant reduction in the amount of iodine required for a given degree of conversion of hydrocarbon feed, while still maintaining a total pressure of 1 atmosphere or greater. The use of inert diluent does not appreciably affect the selectivity of the conversion of hydrocarbon to monoolefins and diolefins of the same carbon number. In other words, diluent or low pressure are not required to permit the conversion of a given hydrocarbon to the corresponding diolefin in extremely high yield in a recycle operation. The only advantage in using diluent or low pressure of reactants in the reaction zone is that a lower mole ratio of iodine to hydrocarbon may be employed to cause a fixed degree of conversion per pass. Some possible advantages in diluting the reactor effluent are pointed out below.

The length of time during which the reactor effluent mixture including hydrogen iodide and iodine can be maintained at temperatures below reaction temperature without substantial or excessive loss of the diolefin is extremely short. At least three separate reactions cause loss of diolefin at temperatures below reaction temperature:

(1) The reaction by which the diolefin is formed is reversible, e.g. (1)

$$C_4H_{10}+I_2 \rightleftharpoons C_4H_8+2HI, \quad (2)\ C_4H_8+I_2 \rightleftharpoons C_4H_6+2HI$$

At lower temperatures the reverse reaction is favored, so that diolefin is converted back to monoolefin and ultimately to paraffin. At any temperature below the actual reaction temperature some loss of diolefin is experienced in this manner. Since equilibrium is closely approached within one second at temperatures of about 400° C. and higher and at still appreciable, though slower, rates between 300° and 400° C., it is necessary that the time of intimate contact between hydrogen iodide and diolefin at temperatures below reaction temperature and down to about 300° C. be kept at less than one second and preferably at from 0.1 to 0.01 second or less to avoid loss of diolefin yield due to the reverse reaction.

(2) Hydrogen iodide and iodine tend to react with compounds containing olefinic double bonds at temperatures below about 300° C. to form stable organic iodides. The rate at which these iodide forming reactions proceed and the equilibrium they attain are functions of the temperature, the concentration of the reactants and the structure of the olefin. Diolefins react rapidly with hydrogen iodide and iodine at temperatures below about 300° C., reactivity increasing with increasing molecular weight and branching. Although the rate at which these reactions go forward decreases with temperature, the equilibrium increasingly favors are iodide. At about 300° C., generally only a small proportion of the iodide is stable but it is very rapidly formed. At 250° C. the reaction is still rapid and a substantial proportion of iodide is stable. At temperatures as low as −80° C. the reaction rate is still appreciable. To avoid loss of diolefin by iodide formation the time of contact between active iodine species and diolefin in the substantially undiluted vapor phase reactor effluent, or even in liquid phase, at temperatures below about 300° C., must be kept to less than one second, preferably less than 0.1 second and most preferably in the lower part of the range between 0.1 and 0.01 second or less.

(3) Hydrogen iodide and iodine promote the polymerization of olefins and especially of diolefins. This effect is most pronounced in a liquid phase containing both HI and $I_2$, particularly if some water is present. The time of contact between active iodine species and desired diolefinic product in such a liquid phase must be kept to a low value, e.g., 1 second or less and preferably between 0.1 and 0.01 second.

Hence, to recover desired diolefins in high yield without prohibitive loss to the corresponding iodides or polymers it is necessary to maintain the time of intimate contact between active iodine species, including iodine and hydrogen iodide, and diolefin at temperatures below 300° C. at less than 1 second and preferably at from 0.1 to 0.01 second or less.

The lowest practical time between reaction and separation of diolefins and iodine species is preferred, such that the loss of diolefins by reaction with or due to iodine species is as nearly zero as possible. The loss of diolefin yield due to back reaction, iodide formation and polymerization is generally held to less than 5% of the feed, preferably less than 1% of the feed, but in no case should it be over 10% of the feed. Only the loss to polymer (item (3) supra) is an actual loss of material from the system in unrecoverable form.

It is, therefore, an essential part of the process of the present invention to withdraw the total reaction product mixture from the reaction zone at a reaction temperature in excess of 300° C. and promptly reduce the rate of reaction of reactive iodine species, including hydrogen iodide and iodine, with the diolefin, preferably by removing the hydrogen iodide and iodine as reactive iodine species from contact with the diolefins in a time of less than 1 second and preferably in less than 0.1 second. Since hydrogen iodide is formed in the reaction it will be the predominant form of iodine species in the effluent except under special conditions, e.g., when the conversion of HI to $I_2$ is carried out in the reaction zone or when a large excess of $I_2$ is charged. Iodine will ordinarily be present in elemental form in the total reaction product mixture due to incomplete conversion of iodine originally charged, and may be present due to regeneration from HI in the reaction zone, e.g., by catalysis of the HI decomposition to $H_2$ and $I_2$ or by oxidation of the HI to $I_2$ and $H_2O$. Other iodine species, such as organic iodides are generally absent or present only in very insignificant amounts, and are not generally reactive towards the desired diolefinic product.

Diluting the reactor effluent with an inert diluent serves to reduce the rate of reaction between the active iodine species present and diolefins by reducing the rate at which collisions of the respective molecules occur in the mixture. Inert diluents are those which react neither with the olefinic product nor with the iodine species present at the prevailing conditions. Typical vapor phase diluents are inert gases, such as the noble gases (helium, argon, etc.) nitrogen, CO or $CO_2$. Under normal operating conditions methane also serves as inert diluent gas. Some dilution of the vapor phase reactor effluent may be achieved by adding an inert diluent to the charge to the reaction zone. When converting saturated hydrocarbons, the same effect is obtained by adjusting reaction conditions to produce a relatively low total conversion, thus permitting unreacted feed hydrocarbons to act as diluent. Additional dilution can be obtained by injecting inert diluent gas into the reactor effluent immediately following the reaction zone. Some cooling may be achieved by this if desired. Dilution within any practical limits can only serve to reduce the rate of reaction between active iodine species and diolefins and not to stop this reaction altogether. Dilution may be used, together with the rapid reduction of temperature, to slow the loss of diolefins by reaction with active iodine species, but must still be followed by the separation of the iodine species from the desired product.

The reactor effluent may be diluted in the liquid phase, e.g. by injecting a suitable liquid which is non-reactive at temperatures below reaction temperature into the reactor effluent after it has entered a cooling system or by injecting a liquid or condensable vapors into the reactor effluent as it enters a cooling system. Saturated or aromatic hydrocarbons are suitable for this purpose. Saturated halogen-containing compounds may also be suitably employed as diluents. Where the formation of organic iodides is not entirely suppressed, such iodides may be recycled from the recovery zone to the reactor effluent, thus serving as inert diluent. Other saturated halogenated compounds, such as mono- or polychlorinated or fluorinated hydrocarbons may suitably be employed as inert diluents. When operating at low conversion of saturated feed hydrocarbons in the reaction zone, the unconverted feed will not only serve as vapor phase diluent, as pointed out above, but may also continue to serve as liquid phase diluent after condensation of the reactor effluent.

Substantial loss of diolefin due to reaction with active iodine species ordinarily cannot be avoided by cooling the substantially undiluted effluent. Cooling to temperatures even as low as −80° C. does not stop the reaction between HI and diolefin, although it does reduce the rate of reaction. Cooling may therefore be employed, together with dilution as discussed supra, to prolong the permissible time of contact between active iodine species and diolefin without prohibitive loss of diolefins to iodides.

The removal of hydrogen iodide and iodine as active iodine species from reactor effluent may be carried out by chemically destroying the iodine species or by physically separating the iodine species from the hydrocarbon compounds.

The hydrogen iodide can be chemically destroyed by conversion into an inorganic iodide by reaction with a base, for instance with an aqueous solution of sodium hydroxide, ammonium hydroxide, potassium hydroxide, calcium hydroxide or the like, or an aqueous solution of a salt of a strong base and a weak acid, e.g. sodium acetate, potassium carbonate or the like. Ethylene glycol or other polar organic solvents can be employed as slovent for the base instead of water at temperatures at which they do not dissolve the hydrocarbons. Organic bases such as amines may be employed by themselves or in suitable solution, e.g. in water. Hydrogen iodide may also be converted to ammonium iodide by reaction with ammonia vapor. Caution must be exercised in reactions with ammonia if free iodine and water are present in the system since explosive nitrogen triiodide may be formed. Hydrogen iodide may also be reacted with other compounds, e.g. boron trifluoride to form an inorganic iodide.

Hydrogen iodide can also be removed, at least in great part, from the reaction product by conversion of the HI to free iodine. This can be achieved by catalytic decomposition to $H_2+I_2$ or by oxidation to $I_2+H_2O$, either initiated in the reaction zone itself or immediately following the reaction zone. The resulting iodine is then removed by a suitable method such as those discussed.

The most suitable method for removing iodine and hydrogen iodide from contact with the reactants without destroying their identity is by contacting the reactor effluent with water or with an aqueous solution of hydrogen iodide having sufficient capacity to dissolve additional hydrogen iodide and iodine. Suitable solutions contain between 0 and 55% HI or more. Such solutions may also contain a substantial amount of free iodine without affecting their capacity for HI and iodine removal. Iodine is believed to be present in aqueous HI solution in the form of association complexes with HI, e.g. $HI_3$, $HI_5$, etc. For purposes of simple presentation, such a solution is herein referred to as containing $H_2O$, HI and $I_2$.

Besides hydrogen iodide, elemental iodine can also be removed from the reaction products mixture by contact with an aqueous solution of a strong base. A typical reaction is $$3I_2+6NaOH \rightarrow 5NaI+NaIO_3+3H_2O$$

Elemental iodine can also be removed by reaction with reducing agents, e.g. aqueous solutions of alkali metal thiosulfate, arsenite, sulfite, bisulfite, or the like.

Similarly, iodine can be removed by brief, intimate contact with an aqueous solution of an inorganic iodide, e.g. of NaI or KI.

Iodine may also be removed from the reactor effluent by selective adsorption on a porous solid adsorbent, e.g. by passing the reactor effluent after removal of HI, and preferably after cooling, into contact with an adsorbent such as activated alumina in the form of a fixed bed or a fluidized bed of finely divided particles.

Iodine may also be removed by condensation, to be recovered either as liquid at temperatures between its melting and boiling points (ca. 114° and 183° C., respectively at atmospheric pressure) or as solid at temperatures below its melting point.

The preferred method of separating the active iodine species from the diolefin product is to inject into the reactor effluent, immediately upon its issuing from the reaction zone, a substantial amount of an aqueous fluid capable of dissolving, when in liquid phase, both hydrogen iodide and iodine, and then promptly recovering and separating an aqueous liquid phase from the resulting mixture. The fluid may be injected in the form of an aqueous liquid in sufficient amount that only part thereof evaporates, thus diluting and cooling the effluent, and part remains in the form of atomized droplets. The fluid may also be injected in such an amount that all of it evaporates, or it may be injected as a vapor. In each of the latter modifications, the fluid serves to dilute and may serve to partially cool the effluent, as well as to increase its flow velocity, and the resulting mixture is promptly passed to a cooling and condensation zone in which at least an aqueous phase is condensed which contains the iodine species. In each case, the resulting aqueous phase containing the iodine species in solution is collected and promptly separated from the diolefins, which may remain in a vaporous or liquified hydrocarbon phase and are later separated therefrom in conventional manner.

Figure 6:
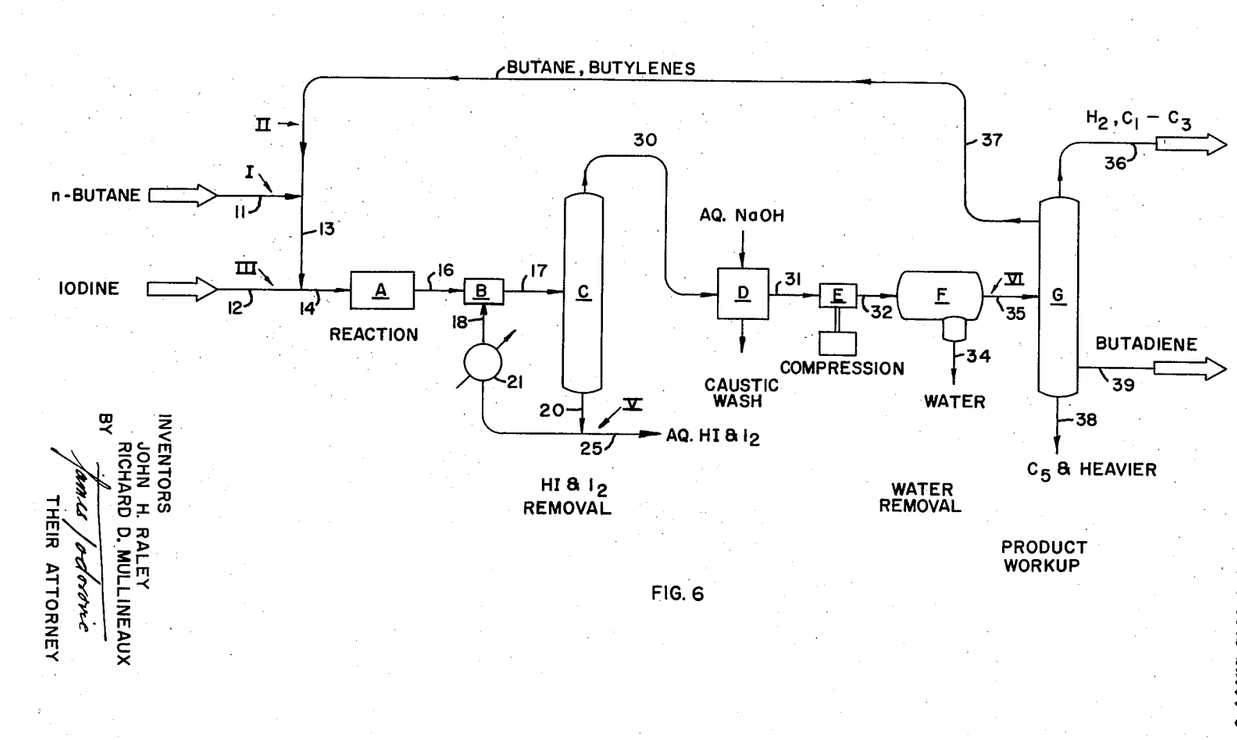
Fig. 6 is a simplified flow diagram illustrating a preferred mode of practicing the invention.

The present invention is further illustrated by means of Fig. 6 of the drawing which shows a schematic flow diagram of one method of operating the present process. For the sake of illustration the operation will be described as applied to the dehydrogenation of n-butane for the production of butadiene with recycle of unconverted butane and butylenes.

The major processing zones and equipment shown are reactor A, contactor B, knockout drum C, caustic wash zone D, compressor E, separator F and separation zone G. n-Butane from any convenient source, not shown, is charged to the system through line 11. Recycle n-butane and butylenes are added to the fresh feed via line 37 and admixed with fresh feed from line 11 in line 13. Iodine, from a source not shown, generally iodine regenerated from HI formed in the process, is charged through line 12. The iodine, butane and butylene enter the reactor A as a vapor mixture via line 14. The mixture is maintained in reactor A at about 580° C. for about 1-2 seconds. The reaction mixture enters line 16 at a temperature of 580° C. It is conducted to contactor B in which it is intimately admixed with an aqueous HI solution added through line 18 at a temperature of 35° C. The aqueous HI may be added, for instance, through a ring of nozzles arranged to provide a fine spray for rapid and intimate contact with the reactor effluent. The resulting mixture of vapors and aqueous HI droplets enters knockout drum C via line 17 at a temperature of about 100° C. In knockout drum C aqueous solution is separated and withdrawn via line 20. Part is returned to line 18. The recycled aqueous solution may be cooled by cooler 21 in line 18. The vapors substantially free of $I_2$ and HI are withdrawn via line 30. The vapors are then passed to caustic scrubbing zone D in which remaining traces of HI and iodine are removed by contact, e.g. with 20% aqueous sodium hydroxide. The used caustic solution may be recycled through the scrubbing zone. The caustic scrubbed vapors are passed through line 31 to compressor E, which may be associated with a suitable cooler, and the condensed liquid passes via line 32 to separator F from which water is withdraw via line 34. The substantially dry hydrocarbon liquid passes via line 35 to separation zone G which represents such equipment as is conventionally employed to segregate light hydrocarbons, butane, butenes, butadiene and heavier material.

For example, in separation zone G propane and lighter products, withdrawn through line 36, are suitably removed in a conventional fractional distillation column, the butadiene is removed from the associated $C_4$ hydrocarbons by extraction with a suitable solvent, e.g. cuprous ammonia acetate and withdrawn through line 39, the butane and butylene which represent the raffinate from the extraction are then withdrawn via line 37 for return to line 13, and small quantities of $C_5$ and heavier material, which may have been separated by fractional distillation from the several fractionating columns, are discarded via line 38.

In order to remove hydrogen iodide from the closed circuit represented by contact zone B, vessel C and associated piping, a bleed stream of aqueous hydrogen iodide containing iodine is continuously withdrawn from line 20 via line 25. This stream is treated in equipment not shown to remove elemental iodine and to convert at least part of the hydrogen iodide to elemental iodine, e.g. by a suitable decomposition or oxidation reaction. The total elemental iodine thus recovered is returned to line 12 for reuse. A more dilute aqueous solution of hydrogen iodide may also be returned from the regeneration zone to said circuit, or water may be added to maintain the required volume.

To further illustrate the application of the present process, material balances for the system of Fig. 6 are shown in Table 1 in which stream I represents the n-butane in line 11; II the butane-butylene recycle stream in line 37; III the iodine in line 12; IV aqueous HI returned from regeneration to the aqueous HI circuit; V the bleed stream of aqueous HI and iodine sent to regeneration via line 25 and VI the hydrocarbon stream in line 35 charged to separation zone G. The stream compositions are given in terms of pounds per hour for a system in which 1000 pounds per hour of n-butane is charged as fresh feed. The percentage compositions of the various streams, are also given.

Since Fig. 6 is a schematic flow diagram, numerous associated items of equipment such as valves, pumps, heat exchangers, and even individual vessels in zones D and G are not shown. The proper placement of such equipment will be readily made by those skilled in the art. The conditions such as temperatures and flow rates are only presented for the purpose of illustration and are not to be construed as limitations on the process.

TABLE 1.—STREAM COMPOSITIONS

| Stream | I | | II | | III | | IV | | V | | VI | |
|---|---|---|---|---|---|---|---|---|---|---|---|---|
| | Lb. | Percent wt. | Lb. | Percent wt. | Lb. | Percent wt. | Lb. | Percent wt. | Lb. | Percent wt. | Lb. | Percent wt. |
| Components: | | | | | | | | | | | | |
| $H_2$ | | | | | | | | | | | 0.7 | .02 |
| $C_1$ | | | | | | | | | | | 14 | .4 |
| $C_2$ | | | | | | | | | | | 24 | .7 |
| $C_3$ | | | | | | | | | | | 36 | 1.0 |
| $C_4H_6$ | | | | 0.3 | | | | | | | 866 | 24.3 |
| $C_4H_8$ | | | 1,810 | 69.9 | | | | | | | 1,820 | 51.0 |
| $C_4H_{10}$ | 1,000 | 100 | 811 | 30.8 | | | | | | | 811 | 22.7 |
| $I_2$ | | | | | 15,430 | 100 | | | 7,320 | 13.1 | | |
| HI | | | | | | | 4,220 | 10.5 | 12,400 | 22.2 | | |
| $H_2O$ | | | | | | | 36,100 | 89.5 | 36,100 | 64.7 | | |

Having described the general features of the invention and various factors which are involved in its practice, details thereof will be illustrated by the following examples, which are not to be considered as limiting thereon.

Example 1

Four runs were made in which a vaporous mixture of iodine and n-butane was passed through an empty quartz tube maintained at a fixed reaction temperature and pressure. The reaction conditions of each of these runs and the results obtained are given in Table 2. In runs Nos. 1, 2, and 3 the reactor effluent was promptly passed into a vessel containing a basic solution which absorbed the hydrogen iodide and iodine. The time between reactor exit and contact with absorbing solution was about one-half second. The effluent mixture was kept at about 300° C. during this time. In run No. 4 about 75 volumes of water vapor per volume of hydrocarbon, at about 100° C., were injected at the reactor exit into the reactor effluent, the resulting mixture being passed within

TABLE 2

| Run No | 1 | | | 2 | | | 3 | | | 4 | | |
|---|---|---|---|---|---|---|---|---|---|---|---|---|
| Feed Hydrocarbon | n-butane | | | n-butane | | | n-butane | | | n-butane. | | |
| Temperature, °C | 490 | | | 525 | | | 550 | | | 575. | | |
| Reactor Pressure, atm | 1 | | | 1 | | | 1 | | | 1. | | |
| Nominal Residence Time,[a] seconds | 4 | | | 2 | | | 1.6 | | | 1.5. | | |
| Molar Ratio, $I_2$/Feed hydrocarbon | 0.4 | | | 0.9 | | | 1.8 | | | 1.87. | | |
| Liquid for HI and $I_2$ removal | Sodium acetate in ethylene glycol. | | | Collidene in ethylene glycol. | | | 3% aqueous NaOH | | | water. | | |
| Time Between Reactor Exit and Liquid or Vapor Contact, seconds[b] | ~0.5[c] | | | ~0.5[c] | | | ~0.5[c] | | | 0. | | |
| Time to Complete iodine species Extraction, seconds[b] | ~0.5 | | | ~0.5 | | | ~0.5 | | | <0.1. | | |
| | Observed | Equilibrium | Observed Percent of Equilibrium | Observed | Equilibrium | Observed Percent of Equilibrium | Observed | Equilibrium | Observed Percent of Equilibrium | Observed | Equilibrium | Observed Percent of Equilibrium |
| Conversion (Based on Carbon in Feed, Percent): | | | | | | | | | | | | |
| To Butenes | 23.5 | 34.3 | 69 | 41.4 | 58.8 | 70 | 56 | 64.2 | 87 | 53.7 | 61.1 | 88 |
| To Butadiene-1,3 | 1.2 | 1.3 | 92 | 4.3 | 6.1 | 71 | 15 | 25 | 60 | 25.4 | 31.5 | 81 |
| To Cracked Products[d] | 0.6 | | | <1 | | | 1 | | | 3.6 | | |
| To Coke | 0 | | | Trace | | | Slight | | | 0.4 | | |
| Heavier than $C_4$, incl. polymers and iodides. | [f]0.3 | | | | | | | | | 2.3 | | |
| Total Conversion | 25.6 | 35.6 | 72 | 55 | 64.9 | 85 | 80 | 89.2 | 90 | 87.2 | 91.6 | 95 |
| Unaccounted Loss | 0.0 | | | 9 | | | 8 | | | 1.8 | | |
| Selectivity[e] | 96 | | | ≥83 | | | ≥89 | | | 91 | | |

[a] Calculated from total input at reaction temperature.
[b] Estimated.
[c] Passage at about 300° C.
[d] Total $C_1$ to $C_3$ hydrocarbons.
[e] Selectivity = moles butenes+butadiene/moles butane disappeared.
[f] $C_4$ iodides only.

less than 0.1 second to a condenser where an aqueous liquid phase, containing the HI and $I_2$, was condensed and separated. The hydrocarbon stream was then, in each case, recovered and analyzed to determine the nature and proportion of the components thereof.

The results are reported in terms of conversion on a feed carbon basis. To illustrate, if 100 moles of butane are fed per hour and 10 moles per hour of butadiene recovered (as found by analysis of the separated and purified hydrocarbon product) then the conversion to butadiene is reported as 10%. If 10 moles of methane are produced, the conversion of butane to methane is ¼×10 or 2.5%, since the amount of carbon in 4 moles of methane is the same as in one mole of butane.

The effect of increasing temperature and iodine-to-butane ratio on the conversion of n-butane to butadiene and butylenes is illustrated in these runs, which were made at temperatures of 490°, 525°, 550°, and 575° C., and at iodine-to-butane mole ratios of 0.4, 0.9, 1.8, and 1.87, respectively. Although residence time was progressively less as temperature and iodine ratio was increased the percent of total thermodynamic equilibrium conversion obtained increased from 72 to 95%, and the percent of butadiene actually recovered from 1.2% to over 25%. Runs Nos. 3 and 4 were carried out at conditions in the preferred range for the present invention. The amount of "unaccounted loss" shown is a function of the experimental conditions and equipment employed. It is believed that the material lost consisted mainly of butylenes and butadiene, so that the actual production of and selectivity to $C_4$ olefinic products were even better than shown in Table 2. It is to be particularly noted that the loss to cracked products and coke was insignificant in runs 1 to 3 and even at the relatively severe conditions of run 4 was only about 4% of the feed carbon.

*Example II*

Runs 5 through 7 were carried out to illustrate the effect of using different aqueous media for separating the hydrogen iodide from the reaction product. The feed, in each of these runs, was diluted with about 1.5 volumes of helium per volume of butane plus iodine. In each of these runs the aqueous medium was injected as a fine liquid stream directly into the effluent vapor stream leaving the reaction zone and atomized in this manner so that there was no time lag between the reaction and contact with the aqueous medium and an estimated time lag of less than 0.1 second between contact with the aqueous medium and complete separation of the HI and substantially complete separation of iodine. The reaction conditions and results of these runs are given in Table 3.

TABLE 3

| Run No | 5 | 6 | 7 |
|---|---|---|---|
| Feed hydrocarbon | n-butane | n-butane | n-butane. |
| Temperature, ° C | 550 | 550 | 550. |
| Reactor pressure, atm | 1 | 1 | 1. |
| Nominal residence time, seconds a. | 1.5 | 1.4 | 1.3. |
| Molar ratio, $I_2$/Feed hydrocarbon | 1.4 | 1.3 | 1.3. |
| Liquid for iodine species removal | 3% aqueous NaOH. | $H_2O$ | 35% aqueous HI. |
| Time between reactor exit and liquid contact, seconds b. | 0 | 0 | 0. |
| Time to complete iodine species, extraction, b seconds. | <0.1 | <0.1 | <0.1. |
| Conversion (based on carbon in feed), percent: | | | |
| To butenes | 55.9 | 54.4 | 57.7. |
| To butadiene-1,3 | 18.4 | 15.0 | 15.9. |
| To cracked products c | 1.3 | 1.4 | 1.0. |
| To coke | 0.006 | Trace | Trace. |
| Total conversion | 75.4 | 78.6 | 75.9. |
| Unaccounted loss | 0 | 7.8 | 1.3. |
| Selectivity d | 98.5 | 88.3 | 97.0. | a Calculated from total input at reaction temperature.
b Estimated.
c Total $C_1$-$C_3$ hydrocarbons.
d Selectivity=moles butenes+butadiene/moles butane disappeared.

These runs were carried out at very similar reaction conditions, run No. 5 having a slightly higher iodine to butane ratio and residence time than the other runs and producing a somewhat higher proportion of butadiene. On the basis of experience in these and other experiments it is considered that the differences in the results are not reflections of differences in the liquid employed for iodine species removal but that, under these conditions, the liquids were equally effective.

*Example III*

Runs 8 and 9 were made in a manner similar to run 1, with butene-1 and butene-2, respectively, as feed. Run No. 10 was made in a manner similar to run No. 4 employing as feed a mixture of 60% butene-1 and 40% butane. The conditions employed and results obtained in runs 8 to 10 are given in Table 4.

TABLE 4

| Run No | 8 | 9 | 10 |
|---|---|---|---|
| Feed hydrocarbon: | | | |
| Butene-1, percent | 100 | | 57 |
| Butene-2, percent | | 100 | |
| Butane, percent | | | 43 |
| Temperature, ° C | 475 | 475 | 550 |
| Reactor pressure, atm | 1 | 1 | 1 |
| Nominal residence time, sec. a | 13 | 13 | 1.1 |
| Molar ratio, $I_2$/feed hydrocarbon | 0.8 | 0.8 | 0.65 |
| Conversion (based on carbon in feed, percent): | | | |
| To Paraffin | 4.5 | 4.7 | |
| To Diolefin | 8.6 | 11.0 | 20.2 |
| To cracked products b | 0.8 | 0.7 | 1.6 |
| To coke | >10 | ~10 | 0.2 |
| Total conversion | 49.6 | 42.8 | 24.0 |
| Unaccounted loss | | | 0.2 |
| Selectivity | c 26.4 | c 36.7 | d 84.2 | a Calculated from total input at reaction temperature.
b Total $C_1$-$C_3$ hydrocarbon.
c Selectivity=moles butane+butadiene/moles butene disappeared.
d Selectivity=moles butadiene/moles feed hydrocarbons disappeared.

Runs 8 and 9 were made at relatively low reaction temperature and long residence times, leading to high coke formation and poor selectivity. Better results can be obtained with olefinic feeds by drastically reducing the residence time. Superior results, however, are obtained as illustrated by run No. 10 by converting monoolefins in the presence of paraffin of the same skeletal structure. The conditions of run No. 10 are similar to those that obtain in a reaction zone when converting a butane feed to butadiene only by recycling product butylenes, as described in connection with the drawings.

*Example IV*

Runs 11–12, 13, and 14 were made in a manner similar to run 1 and employing as feed hydrocarbon n-pentane, cyclopentane and methylcyclopentane, respectively. Essential conditions and results are shown in Table 5.

In operations with n-pentane, run 11 was made at reaction conditions including an excessively long residence time (35 seconds nominal) and a relatively high iodine to hydrocarbon ratio. As a result there was a great deal of coke and gas formed and the selectivity to olefin and diolefin was only 44%. In run No. 12 the same feed was converted at about the same temperature with a residence time of 8 seconds and a relatively low iodine to hydrocarbon ratio. The conversion to monoolefin was about the same, that to diolefin was more than doubled and substantially no coke was formed, the selectivity being brought up to 94%. By increasing temperature or iodine-to-hydrocarbon ratio, or both, with an appropriate reduction in residence time, if required, higher conversions to the desired olefins (for recycling, if desired) and diolefin can be obtained at high selectivity.

Runs 13 and 14 were made with cyclopentane and methylcyclopentane, respectively. The reaction conditions included residence times that were excessively long, considering the relatively great reactivity of the feed hy-

TABLE 5

| Run No | 11 | 12 | 13 | 14 |
|---|---|---|---|---|
| Feed hydrocarbon | n-pentane | n-pentane | cyclopentane | methylcyclopentane. |
| Temperature, °C | 500 | <500 | 453 | 473+12. |
| Reactor pressure, atm | 1 | 1 | 1 | 1. |
| Nominal residence time, seconds [a] | 35 | 8 | 17 | 8. |
| Molar ratio, $I_2$/feed hydrocarbon | 3.5 | 0.4 | 0.2 | 0.3. |
| Conversion (based on carbon in feed, percent): | | | | |
|    To monoolefin | 32.8 | 30.1 | 7.6 | 11.4. |
|    To diolefin | 1 | 2.2 | 1.9 | 0.8. |
|    To cracked products [b] | 11 | 1.6 | trace | 0.1. |
|    To coke | 30-40 | <0.1 | [d] | [e]. |
| Total conversion | 77.0 | 34.4 | 13.3 | 18.5. |
| Unaccounted loss | | 2.7 | [d] | [e]. |
| Selectivity [c] | 44 | 94 | 72 | 66. |

[a] Calculated from total input at reaction temperature.
[b] Total $C_1$–$C_4$ hydrocarbons.
[c] Selectivity = moles olefin+diolefin/mole feed hydrocarbon disappeared.
[d] Total coke+loss = 3.4%.
[e] Total coke+loss = 6%.

drocarbon, thus favoring side reactions such as coke formation, and also included relatively low temperatures and iodine-to-hydrocarbon ratios, thus limiting the results to relatively low possible conversions to desired products. Under these conditions there was essentially no cracking, but appreciable coke formation and a consequent low selectivity. Substantially improved conversion to and recovery of diolefins can be obtained with these feed stocks by operating at shorter residence times, higher iodine-to-hydrocarbon ratios, and higher temperatures in the range set out hereinbefore.

*Example V*

The effect of shortening the residence time between the exit of the reaction zone and the point at which separation of active iodine species from diolefin in the product takes place is further illustrated in Table 6. All these runs were made with n-butane feed.

the path was heated to 300° C. In run 15 the butadiene yield, hence its concentration in the effluent stream, was quite low, thus facilitating more complete recovery. (2) In run 16, 71% of equilibrium was recovered, using the same time interval and an unheated bath. (3) In run 17, 59% was recovered, using a 1.4 second interval. (4) In run 18, with a 2.5 second interval, recovery was down to 10% of equilibrium. Run No. 19 illustrates that chilling the reactor effluent to about −190° C. within less than 30 seconds and later extracting the iodine species from the condensate by ether caused complete loss of butadiene. In this case, 2-iodobutane was recovered in a very substantial amount. This material was presumably produced both from butylene and butadiene originally present in the reactor effluent.

In the description of this invention a variety of means have been disclosed for achieving the rapid reduction of the rate of reaction between active iodine species and

TABLE 6

| Run No. | Reactor Temp., °C. | $I_2$/Butane, Mole Ratio | Basis Carbon in Feed, Percent | | | | Iodine Species Absorbing Liquids |
|---|---|---|---|---|---|---|---|
| | | | Total Conversion | Butadiene Recovered | Butadiene Yield at Equilibrium | Butadiene Recovery, Percent of Equilibrium | |
| 15 | 493 | 0.4 | 26 | 1.2 | 1.2 | 100 | Sodium acetate in ethylene glycol. |
| 16 | 525 | 0.9 | 55 | 4.3 | 6.1 | 71 | Collidene in ethylene glycol. |
| 17 | 525 | 1.1 | 33 | 5 | 8.5 | 59 | Sodium acetate in ethylene glycol. |
| 18 | 525 | 0.9 | 55 | 0.6 | 6.0 | 10 | Do. |
| 19 | 550 | 1.1 | | 0 | ~7 | 0 | Ether at −80° C. |

| Run No. | Method of Contact | Time From Reactor Exit to Contact, Seconds | Iodide Formation | Other Derivatives of Olefin and Diolefin, Basis Feed Carbon, Percent |
|---|---|---|---|---|
| 15 | As in Run 1 | 0.5 [b] | [a] | |
| 16 | do | ~0.5 | [a] | |
| 17 | do | ~1.4 | [a] | |
| 18 | do | ~2.5 | [c] | Sec., butyl alcohol—2.0; Sec., butyl acetate—4.0. |
| 19 | Effluent diluted with equal volume $N_2$, then condensed by liquid $N_2$; iodine species removed from condensate by ether extraction at −80° C. | To Condensation <30 sec.; To extraction ~3 hrs. | 2-iodo butane 50% (basis feed C). | |

[a] No attempt made to observe or determine iodides or other derivatives.
[b] Path from reactor exit to iodine species absorption held at 300° C.
[c] No attempt made to observe or determine iodides.

In Table 6, the butadiene recovery as percent of equilibrium value is an indication of the completeness of recovery. Experience indicates that at least about 85% of the equilibrium conversion to butadiene was probably reached in the reaction zone.

Comparing runs 15 through 18 it is seen that: (1) In run 15, 100% of equilibrium was recovered; the time between reactor exit and absorption was 0.5 second but diolefins in the reactor effluent. It is to be understood that the several means are not all equally effective in each reaction system, and furthermore, some means that are very effective from the chemical point of view may prove to be relatively less desirable for commercial use.

We claim as our invention:

1. A process for the production of diolefins from more saturated non-iodine-aromatizable hydrocarbons having the same carbon skeletons as said diolefins which comprises contacting in a reaction zone a hydrocarbon feed of at least one of said more saturated hydrocarbons and at least about 0.1 mole of iodine per mole of hydrocarbon charged to said reaction zone at a reaction temperature of at least 300° C. to produce a mixture comprising a substantial proportion of diolefin, iodine and hydrogen iodide, withdrawing said mixture from said reaction zone at said reaction temperature and within 0.1 second of said withdrawal removing substantially all hydrogen iodide and iodine from the hydrocarbon phase of said mixture.

2. A process for the production of diolefins from a hydrocarbon feed having no more than one double bond per molecule and having from four to five carbon atoms in a chain, in which no aliphatic chain carbon and no 4-carbon-ring carbon is quaternary and no more than one 5-carbon-ring carbon is quaternary, and in which no ring carries aliphatic substituents capable of closing a 6-carbon-ring, which comprises contacting in a reaction zone in vapor phase said hydrocarbon feed and at least 0.1 mole of iodine per mole of hydrocarbon charged to said reaction zone at a reaction temperature between 300° and 750° C. to produce a mixture comprising substantial proportions of diolefin, iodine and hydrogen iodide, withdrawing said mixture from said reaction zone in vapor phase at a temperature of at least 300° C. and within 0.1 second of said withdrawal removing substantially all hydrogen iodide and iodine from the vapor phase.

3. A process according to claim 2 in which said hydrocarbon feed is a paraffin.

4. A process according to claim 2 in which said hydrocarbon feed is an olefin.

5. A process according to claim 2 in which said hydrocarbon feed is a naphthene.

6. A process according to claim 2 in which said hydrocarbon feed is a mixture of saturated and unsaturated hydrocarbons.

7. A process according to claim 2 in which said hydrocarbon feed is n-butane, and said reaction temperature is between 400° and 600° C.

8. A process according to claim 2 in which said hydrocarbon feed is n-pentane and said reaction temperature is between 400° and 600° C.

9. A process according to claim 2 in which said hydrocarbon feed is isopentane and said reaction temperature is between 400° and 600° C.

10. A process according to claim 2 in which said hydrocarbon feed is cyclopentane and said reaction temperature is between 425° and 650° C.

11. A process for converting a hydrocarbon having no more than one double bond per molecule and having from four to five carbon atoms in a chain, in which no aliphatic chain carbon and no 4-carbon-ring carbon is quaternary and no more than one 5-carbon-ring carbon is quaternary, and in which no ring carries aliphatic substituents capable of closing a 6-carbon-ring, into a product comprising monoolefins and at least one diolefin having the same number of carbon atoms per molecule as said hydrocarbon which comprises contacting in a reaction zone in vapor phase said hydrocarbon and at least 0.1 mole of iodine per mole of hydrocarbon charged to said reaction zone at a reaction temperature between 300° and 750° C. to form a vapor phase reaction product including substantial proportions of said monoolefins and said diolefin and of hydrogen iodide and iodine, withdrawing the reaction product from said reaction zone, and then intimately contacting the total vapor phase reaction product at said reaction temperature with a liquid aqueous solution having a substantial solubility for hydrogen iodide and elemental iodine and removing thereby substantially all hydrogen iodide and iodine from said vapor phase within no more than about 0.1 second from said withdrawal, separating an aqueous phase containing the iodine species from an iodine-free hydrocarbon phase, both phases being substantially free of organic compounds of iodine, and recovering at least said diolefin from the hydrocarbon phase.

12. A process according to claim 11 in which said solution is a solution of hydrogen iodide.

13. A process for the production of a diolefin from a saturated aliphatic hydrocarbon having a chain of from four to five non-quaternary carbon atoms which comprises contacting in a reaction zone a mixture comprising said saturated hydrocarbon, olefins having the same carbon skeleton as said saturated hydrocarbon and recycled to said reaction zone and elemental iodine in the ratio of at least 0.1 mole of iodine per mole of hydrocarbon added to said reaction zone, for a time in the range between 0.01 and 10 seconds, at a partial pressure of iodine plus hydrocarbons in the range between 0.1 and 10 atmospheres and at a temperature in the range between 300° and 750° C. to produce a mixture comprising at least 10% of said diolefin and no more than 50% of said saturated hydrocarbon based on the amount charged to said reaction zone and containing substantial proportions of elemental iodine and hydrogen iodide, withdrawing said mixture from said reaction zone at a temperature of at least 300° C., contacting it with an aqueous liquid stream comprising hydrogen iodide under conditions of intimate contact to absorb the hydrogen iodide and iodine from said mixture into the aqueous liquid phase within 0.1 second of the time of withdrawing said mixture from said reaction zone, separating the resulting aqueous liquid phase from the hydrocarbons remaining in vapor phase, both phases being substantially free of organic compounds of iodine, subsequently subjecting the hydrocarbons to contact with aqueous caustic to remove remaining iodine species therefrom, compressing the resulting hydrocarbon stream and condensing it to form a liquid, separating the remaining water from the liquid hydrocarbon, charging the hydrocarbon to a separation step, removing resulting diolefins as a product and separating unconverted saturated hydrocarbon and monoolefin corresponding to said saturated hydrocarbon for return as a part of the charge to said reaction zone.

14. A process according to claim 13 in which said aqueous liquid phase separated from said hydrocarbons is returned in major part to contact with said mixture withdrawn from the reaction zone.

References Cited in the file of this patent

UNITED STATES PATENTS

| | | |
|---|---|---|
| 1,925,421 | Van Peski | Sept. 5, 1933 |
| 2,259,195 | Baehr et al. | Oct. 14, 1941 |
| 2,392,739 | Horeczy et al. | Jan. 8, 1946 |

FOREIGN PATENTS

| | | |
|---|---|---|
| 849,804 | France | Aug. 28, 1939 |

OTHER REFERENCES

Egloff: "Reactions of Pure Hydrocarbons," p. 196.